Patented Nov. 14, 1950

2,529,866

UNITED STATES PATENT OFFICE 2,529,866

COPOLYMERS OF VINYL BENZOATE AND POLYUNSATURATED CARBONATE ESTERS

Earl J. Carlson, Akron, Ohio, assignor to The B. F. Goodrich Company, New York, N. Y., a corporation of New York No Drawing. Application May 1, 1947, Serial No. 745,255

18 Claims. (Cl. 260—77.5)

This invention relates to a class of hard, clear, non-thermoplastic, resinous copolymers and to their preparation, and pertains more particularly to copolymers of vinyl benzoate and certain polyunsaturated esters.

It is known that polyallyl esters and similar compounds may be polymerized to form hard, clear, insoluble, infusible, resinous products. However, this polymerization proceeds slowly and the final product often does not have the desired hardness. Furthermore, relatively large amounts of catalyst must be used to effect the polymerization. The use of a large amount of catalyst is objectionable, however, because it destroys color and causes water-clear polymers to turn yellow as they age.

I have now discovered that these difficulties can be overcome by copolymerizing certain polyallyl esters or similar compounds with vinyl benzoate. This polymerization takes place much more rapidly and the resulting product is harder and less brittle than that obtained when the polyallyl ester is polymerized alone. In addition, the amount of catalyst used can be reduced so that the undesirable effects obtained with large amounts of catalyst are not present.

The monomers which may be polymerized with vinyl benzoate, possess the general formula

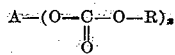

wherein R is an alkenyl group such as allyl, methallyl, 2-ethylallyl, 2-butylallyl, vinyl, isopropenyl, 3-butenyl

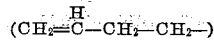

or other alkenyl group which possesses a methylene (CH$_2$) group attached by a double bond to a carbon atom (the term "alkenyl" being used hereinafter only in this connection); A is an organic radical derived by removing OH groups from a polyhydroxy compound, preferably one composed only of carbon, hydrogen and oxygen or one composed only of carbon, hydrogen, oxygen and halogen, and $x$ is a number from 2 to 4. Among the compounds of this class are polyallylcarbonate esters of aliphatic and alicyclic polyhydroxy compounds such as diallyl ethylene glycol dicarbonate, diallyl diethylene glycol dicarbonate, diallyl triethylene glycol dicarbonate, diallyl tetraethylene glycol dicarbonate, diallyl propylene glycol dicarbonate, diallyl dipropylene glycol dicarbonate, diallyl tripropylene glycol dicarbonate, diallyl tetrapropylene glycol dicarbonate, diallyl pentamethylene glycol dicarbonate, diallyl alpha-glycerol dicarbonate, diallyl 1,2,3-trihydroxybutane dicarbonate, di-, tri-, or tetra (allylcarbonate) esters of erythitol, pentaerythitol, sorbitol, pyrogalliotol, mesitol, and the like; polyallylcarbonate esters of aromatic polyhydroxy compounds such as diallyl hydroquinone dicarbonate, diallyl resorcinol dicarbonate, diallyl catechol dicarbonate, diallyl pyrogallol dicarbonate, bis-[p-(allylcarbonato) phenyl] ether, bis-[p-(allylcarbonato) benzyl] ether, bis-[beta-(allylcarbonato) naphthyl] ether and the like; bis-[p-(allylcarbonato) oxymethyl] furan; and similar compounds wherein in the allyl groups are replaced by other of the above-mentioned alkenyl groups.

Other compounds of this class which form particularly useful copolymers with vinyl benzoate include the polyalkenylcarbonate esters of alkylene bis-phenols. These compounds possess the general formula

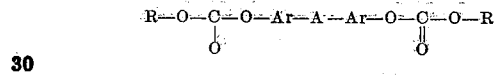

wherein R is an alkenyl radical of the type described, preferably allyl or methallyl; Ar is a bivalent aromatic radical having its connecting valences on nuclear carbon atoms, such as an arylene radical, a nuclear halogenated arylene radical, an alkoxyarylene radical, or the like; and A is an alkylene radical, preferably having each of its connecting valences on the same carbon atom i. e., it is preferably an alkylidene radical. Among these compounds are the bis-[(p-alkenyl carbonato) halophenyl] alkanes (in which the bivalent aromatic radical is halogenated) such as 2,2-bis-(-4-allyl carbonato-3,5-dichlorophenyl) propane, 2,2-bis-(-4-methallyl carbonato-3,5-dichlorophenyl) propane, bis-(-4-allyl carbonato-3,5-dichlorophenyl) methane, 2-2-bis-(-4-allyl carbonato-3,5-dichlorophenyl) butane, 2,2-bis-(-4-methallyl carbonato-3,5-dichlorophenyl) butane, 2,2-bis-(-4-allyl carbonato-3-chlorophenyl) propane, 2,2-bis-(-4-methallyl carbonato-3-chlorophenyl) propane, 1,2-bis-(-4-allyl carbonato-3,5 - dichlorophenyl) propane, 1,1 - bis - (-4-allyl carbonato-3,5-dichlorophenyl) heptane, 4,4-bis-(-4-allyl carbonato-3,5-dichlorophenyl) heptane, 1,2 - bis - ( -4 - allyl carbonato-3-chlorophenyl) ethane, 2,2-bis-(-4-allyl carbonato-3-bromophenyl) propane, 2,2-bis-(-4-allyl carbonate-3-fluorophenyl) propane, 2,2-bis-(-4-allyl carbonato-3-iodophenyl) propane, and the like.

Other alkenylcarbonate esters of bis-phenols of this class which may be used to form copolymers according to this invention are those in which the bivalent aromatic radical is an arylene radical and include 2,2-bis-(-4-allyl carbonato phenyl) propane, 2,2-bis-(-4-methallyl carbonato phenyl) propane, bis-(-4-allyl carbonato phenyl) methane, bis-(-4-methallyl carbonato phenyl) methane, 2,2-bis-(-4-allyl carbonato phenyl) butane, 1,2-bis-(-4-allyl carbonato phenyl) butane, bis-(-4-allyl carbonato phenyl) methane, 2,2-bis-(-4-allyl carbonato phenyl) heptane, 3,3-bis-(-4-allyl carbonato phenyl) pentane, 1,5-bis-(-4-allyl carbonato phenyl) pentane, and the like.

Still other alkenylcarbonate esters of bis-phenols of the above general formula include those in which the bivalent aromatic radical is a naphthylene instead of a phenylene radical, those in which the alkenylcarbonate radicals are attached to the aromatic ring in positions other than para- to the alkylidene radical and those which contain other of the above-mentioned alkenyl groups instead of allyl or methallyl.

In the practice of the invention one or more of the above described polycarbonate esters is mixed with vinyl benzoate, a catalyst added and the mixture polymerized by heating. The amount of vinyl benzoate is not critical, and may be varied considerably. In general, it is desirable to use mixtures containing from 10 to 60 percent by weight of vinyl benzoate and from 40 to 99 percent by weight of the carbonate ester, but mixtures containing from 1 to 75 parts of vinyl benzoate and from 25 to 99 parts of the carbonate ester may all be used depending on the particular properties desired in the copolymer.

The mixture of the carbonate ester and vinyl benzoate may be polymerized at temperatures from 25° C. to 150° C. and preferably at 50° C. to 100° C. in the presence of a polymerization catalyst, or in solution in an organic solvent or in aqueous emulsion or in any other desired manner. Preferably, the mixed monomers, which are liquid at the polymerization temperature, are mixed with catalyst and heated in a suitable form or on a casting surface until a solid, insoluble, infusible polymer is formed. It is often desirable that the polymerization be carried out in two stages, first to form a solid gel, which may be shaped as desired and then to form the final insoluble, infusible, hard polymeric material.

The following table contains a number of specific examples of copolymers of vinyl benzoate and 2,2-bis-(-4-allyl carbonato-3,5-dichlorophenyl) propane and of vinyl benzoate and 2,2-bis-(-4-allyl carbonato phenyl) propane dicarbonate prepared by varying the weight percentage of vinyl benzoate from 0 to 60 percent. The copolymers were prepared by heating mixtures of the dicarbonate ester with the various proportions of vinyl benzoate for 24 hours at 75° C. and in the presence of 1 percent by weight of benzoyl peroxide as a catalyst, and the gel time, (the time required for the liquid mixture to be transformed into a solid gel) and the Barcol Impressor hardness of the final product were measured, and are included in the table:

| Example | Weight per cent vinyl benzoate | Weight per cent dicarbonate ester | Gel time (minutes) | Barcol Impressor hardness |
|---|---|---|---|---|
| 2,2-BIS-(-4-ALLYL CARBONATO-3,5-DICHLOROPHENYL) PROPANE | | | | |
| I | 0 | 100 | 120 | 32 |
| II | 10 | 90 | 60 | 38 |
| III | 20 | 80 | 55 | 41 |
| IV | 30 | 70 | 50 | 42 |
| V | 40 | 60 | 48 | 43 |
| VI | 50 | 50 | 45 | 44 |
| 2,2-BIS-(-4-ALLYL CARBONATO PHENYL) PROPANE | | | | |
| VII | 0 | 100 | 145 | 0 |
| VIII | 10 | 90 | 100 | 4–8 |
| IX | 20 | 80 | 72 | 21–23 |
| X | 30 | 70 | 60 | 26–27 |
| XI | 40 | 60 | 58 | 28–29 |
| XII | 50 | 50 | 55 | 30–32 |
| XIII | 60 | 40 | 51 | 32–33 |

The above table shows that as the amount of vinyl benzoate is increased, the rate of polymerization also increases. It also shows the increase in hardness obtained by increasing the percentage of vinyl benzoate.

When other dicarbonate esters are used to form copolymers with vinyl benzoate similar improvements in hardness and gel time are obtained. Thus when diallyl diethylene glycol dicarbonate with varying percentages of vinyl benzoate were polymerized by the same method used in Examples I through XIII, the following results were obtained:

| Example | Weight per cent vinyl benzoate | Weight per cent dicarbonate ester | Gel time (minutes) | Barcol Impressor hardness |
|---|---|---|---|---|
| XIV | 0 | 100 | 165 | 0 |
| XV | 20 | 80 | 70 | 8–12 |
| XVI | 30 | 70 | 60 | 15–17 |
| XVII | 40 | 60 | 52 | 18–21 |
| XVIII | 50 | 50 | 48 | 21–23 |

It is apparent, therefore, that the invention is applicable to any of the polyalkenyl carbonate esters of polyhydroxy compounds.

The catalyst that is used in the polymerization may be any of the usual polymerization catalysts, preferably a peroxygen compound such as hydrogen peroxide, silver peroxide, sodium persulfate, the perborates, the percarbonates, benzoyl peroxide, caproyl peroxide, lauryol peroxide, acetone peroxide, acetyl benzoyl peroxide and other organic peroxides and the like. Because of the color effect heretofore explained, it is desirable that the amount of catalyst be kept below 3, and preferably from 0.1 to 1 percent based on the material polymerized, but where the slight color effect is not serious, percentages as high as 5 and even higher, may be utilized.

The products of the polymerization are transparent, rigid nonthermoplastic copolymers which are generally colorless unless a large amount of catalyst is used, in which case a slight reddish tinge is imparted to the product.

The unusual and very desirable feature of extremely low shrinkage, (less than 9%) during the polymerization reaction is obtained when the polyalkenyl carbonate esters of alkylidene bis-phenols and halogenated bis-phenols are polymerized with vinyl benzoate. This property, of from the class consisting of hydrocarbon radicals, radicals of the structure $R_1$—O—$R_1$ wherein each $R_1$ is a hydrocarbon radical containing more than 1 carbon atom, and a halogen-substituted hydrocarbon radicals, and $x$ is a number from 2 to 4, adding a peroxygen catalyst, and heating the mixture until it is polymerized to an infusible, insoluble state.

8. A method of preparing a hard, clear, non-thermoplastic copolymer which comprises mixing from 10 to 60 percent by weight of vinyl benzoate and from 40 to 90 percent by weight of 2,2-bis-(-4-allyl carbonato-3,5-dichlorophenyl) propane, adding an organic peroxide catalyst, and heating the mixture until it is polymerized to an infusible, insoluble state.

9. A method of preparing a hard, clear, non-thermoplastic copolymer which comprises mixing from 10 to 60 percent by weight of vinyl benzoate and from 40 to 90 percent by weight of 2,2-bis-(-4-allyl carbonatophenyl) propane, adding an organic peroxide catalyst, and heating the mixture to an infusible, insoluble state.

10. A hard, clear, non-thermoplastic polymeric material prepared by the polymerization of a mixture of 10 to 60 percent by weight of vinyl benzoate and 40 to 90 percent by weight of diallyl diethylene glycol dicarbonate.

11. A polymerizable material comprising a mixture of 10 to 60 percent by weight of vinyl benzoate and 40 to 90 percent by weight of diallyl diethylene glycol dicarbonate, said mixture being capable of polymerization when heated in the presence of an organic peroxide catalyst.

12. A method of preparing a hard, clear, non-thermoplastic copolymer which comprises mixing from 10 to 60 percent by weight of vinyl benzoate and from 40 to 90 percent by weight of diallyl diethylene glycol dicarbonate, adding an organic peroxide, and heating the mixture until it is polymerized to an infusible, insoluble state.

13. A hard, clear, non-thermoplastic polymeric material prepared by the polymerization of a mixture of from 10 to 60 percent by weight of vinyl benzoate and from 40 to 90 percent by weight of a bis-(-allyl carbonato halophenyl) propane.

14. A hard, clear, non-thermoplastic polymeric material prepared by the polymerization of a mixture of from 10 to 60 percent by weight of vinyl benzoate and from 40 to 90 percent by weight of a bis-(-allyl carbonato phenyl) propane.

15. A polymerizable material comprising a mixture of from 10 to 60 percent by weight of vinyl benzoate and from 40 to 90 percent by weight of a bis-(-allyl carbonato halophenyl) propane, said mixture being capable of polymerization when heated in the presence of an organic peroxide catalyst.

16. A polymerizable material comprising a mixture of from 10 to 60 percent by weight of vinyl benzoate and from 40 to 90 percent by weight of a bis-(-allyl carbonato phenyl) propane, said mixture being capable of polymerization when heated in the presence of an organic peroxide catalyst.

17. A method of preparing a hard, clear, non-thermoplastic copolymer which comprises mixing from 10 to 60 percent by weight of vinyl benzoate and from 40 to 90 percent by weight of a bis-(-allyl carbonato halophenyl) propane, adding an organic peroxide catalyst, and heating the mixture until it is polymerized to an infusible insoluble state.

18. A method of preparing a hard, clear, non-thermoplastic copolymer which comprises mixing from 10 to 60 percent by weight of vinyl benzoate and from 40 to 90 percent by weight of a bis-(-allyl carbonato phenyl) propane, adding an organic peroxide catalyst, and heating the mixture until it is polymerized to an infusible, insoluble state.

EARL J. CARLSON.

REFERENCES CITED

The following references are of record in the file of this patent:

UNITED STATES PATENTS

| Number | Name | Date |
|---|---|---|
| 2,144,067 | Kranzlein | Jan. 17, 1939 |
| 2,384,115 | Muskat et al. | Sept. 4, 1945 |
| 2,401,581 | Muskat et al. | June 4, 1946 |
| 2,403,112 | Muskat et al. | July 2, 1946 |
| 2,414,400 | Strain | Jan. 14, 1947 | course, renders the materials extremely valuable for use as molding resins of the thermosetting variety, making it possible to produce molded objects to accurate dimensions free from strain, in contrast to other unsaturated polyesters which shrink as much as 15% to 25% or more during the polymerization reaction, and consequently find no application for this purpose.

Rigid sheets may be cast from the mixed monomers which show outstanding resistance to chemicals, abrasion, craze, and distortion under heat, and fully cured sheets can be formed at elevated temperatures into severe simple curvatures or moderate compound curvatures. The sheets so prepared possess outstanding flexural strength. In the following example a cast sheet of a copolymer of vinyl benzoate and 2,2-bis-(-4-allyl carbonato-3,5-dichlorophenyl) propane was prepared and tested for flexural strength, flexural modulus, and energy to break.

Example XIX

A ⅛"x3"x3" sheet was prepared by casting a mixture of 80 parts of 2,2-bis-(-4-allyl carbonato-3,5-dichlorophenyl) propane, 20 parts vinyl benzoate, and containing 1 part of benzoyl peroxide as catalyst, and heating the casting at 75° C. for a period of twenty-four hours. Flexural tests were then conducted on the sheet and the following results obtained:

| | | |
|---|---|---|
| Flexural strength | p. s. i. | 16,000 |
| Flexural modulus | p. s. i. | 525,000 |
| Energy to break | ft. lbs./in.³ | 3.05 |

The above material is substantially less brittle than the polymer prepared by the polymerization of the dicarbonate ester alone which has the following flexural properties:

| | | |
|---|---|---|
| Flexural strength | p. s. i. | 9,240 |
| Flexural modulus | p. s. i. | 270,000 |
| Energy to break | ft. lbs./in.³ | 2.5 |

Similar improvements in brittleness qualities are obtained when vinyl benzoate and other dicarbonate esters are polymerized. For example, a ¼" x 12" x 12" sheet of a copolymer of 60 parts diallyl diethylene glycol dicarbonate and 40 parts vinyl benzoate prepared as in Example XIX in the presence of 1% benzoyl peroxide as catalyst had the following flexural properties:

| | | |
|---|---|---|
| Flexural strength | p. s. i. | 11,860 |
| Flexural modulus | p. s. i. | 331,500 |
| Energy to break | ft. lbs./in.³ | 3.76 |

A polymer of diallyl diethylene glycol dicarbonate using 1% benzoyl peroxide as catalyst and prepared as in Example XIX was found to be too soft to test for flexural properties.

Other of the polyesters listed above may also be polymerized by similar methods to give hard, clear, non-thermoplastic resins using the same or other catalysts. It is also possible to employ mixtures of two or more of these polyesters with each other in a polymerization with vinyl benzoate, as well as mixtures of these polyesters and vinyl benzoate with other polymerizable unsaturated compounds, as well as with plasticizers, pigments, fillers, other polymers or resins, dyes, etc.

Although specific examples of the invention have been herein described, it is not intended to limit the invention solely thereto, but to include all of the variations and modifications falling within the spirit and scope of the appended claims.

I claim:

1. A hard, clear, non-thermoplastic polymeric material prepared by the polymerization of a mixture of from 10 to 60 percent by weight of vinyl benzoate with from 40 to 90 percent by weight of a compound of the formula

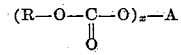

wherein R is an alkenyl radical containing from 2 to 7 carbon atoms and having a methylene group attached by a double bond to a carbon atom, A is a polyvalent unreactive organic radical containing from 2 to 19 carbon atoms and selected from the class consisting of hydrocarbon radicals, radicals of the structure $R_1$—O—$R_1$ wherein each $R_1$ is a hydrocarbon radical containing more than 1 carbon atom, and halogen-substituted hydrocarbon radicals, and $x$ is a number from 2 to 4.

2. A hard, clear, non-thermoplastic polymeric material prepared by the polymerization of a mixture of 10 to 60 percent by weight of vinyl benzoate and 40 to 90 percent by weight of 2,2-bis-(-4-allyl carbonato-3,5-dichlorophenyl) propane.

3. A hard, clear, non-thermoplastic polymeric material prepared by the polymerization of a mixture of 10 to 60 percent by weight of vinyl benzoate and 40 to 90 percent by weight of 2,2-bis-(-4-allyl carbonato phenyl) propane.

4. A polymerizable material comprising a mixture of from 10 to 60 percent by weight of vinyl benzoate and from 40 to 90 percent by weight of a compound of the formula

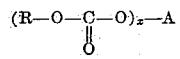

wherein R is an alkenyl radical containing from 2 to 7 carbon atoms and having a methylene group attached by a double bond to a carbon atom, A is a polyvalent unreactive organic radical containing from 2 to 19 carbon atoms and selected from the class consisting of hydrocarbon radicals, radicals of the structure $R_1$—O—$R_1$ wherein each $R_1$ is a hydrocarbon radical containing more than 1 carbon atom, and halogen-substituted hydrocarbon radicals, and $x$ is a number from 2 to 4, said mixture being capable of polymerization when heated in the presence of an organic peroxide catalyst.

5. A polymerizable material comprising a mixture of 10 to 60 percent by weight of vinyl benzoate and 40 to 90 percent by weight of 2,2-bis-(-4-allyl carbonato-3,5-dichlorophenyl) propane, said mixture being capable of polymerization when heated in the presence of an organic peroxide catalyst.

6. A polymerizable material comprising a mixture of 10 to 60 percent by weight of vinyl benzoate and 40 to 90 percent by weight of 2,2-bis-(-4-allyl carbonato phenyl) propane, said mixture being capable of polymerization when heated in the presence of an organic peroxide catalyst.

7. A method of preparing a hard, clear, non-thermoplastic copolymer which comprises mixing from 10 to 60 percent by weight of vinyl benzoate and from 40 to 90 percent by weight of a compound of the formula

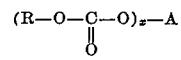

wherein R is an alkenyl radical containing from 2 to 7 carbon atoms and having a methylene group attached by a double bond to a carbon atom, A is a polyvalent unreactive organic radical containing from 2 to 19 carbon atoms and selected

Certificate of Correction

Patent No. 2,529,866                          November 14, 1950

EARL J. CARLSON

It is hereby certified that error appears in the printed specification of the above numbered patent requiring correction as follows:

Column 2, lines 27 to 29, inclusive, for that portion of the formula reading

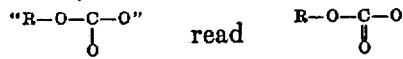

column 5, line 4, for the words "to accurate" read *of accurate*; column 7, line 40, after "peroxide" and before the comma insert *catalyst*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*